April 3, 1934.  W. D. DAVIDSON  1,953,339

DRAW WORKS

Filed July 12, 1932  6 Sheets-Sheet 1

INVENTOR:
William D. Davidson,
BY
ATTORNEY.

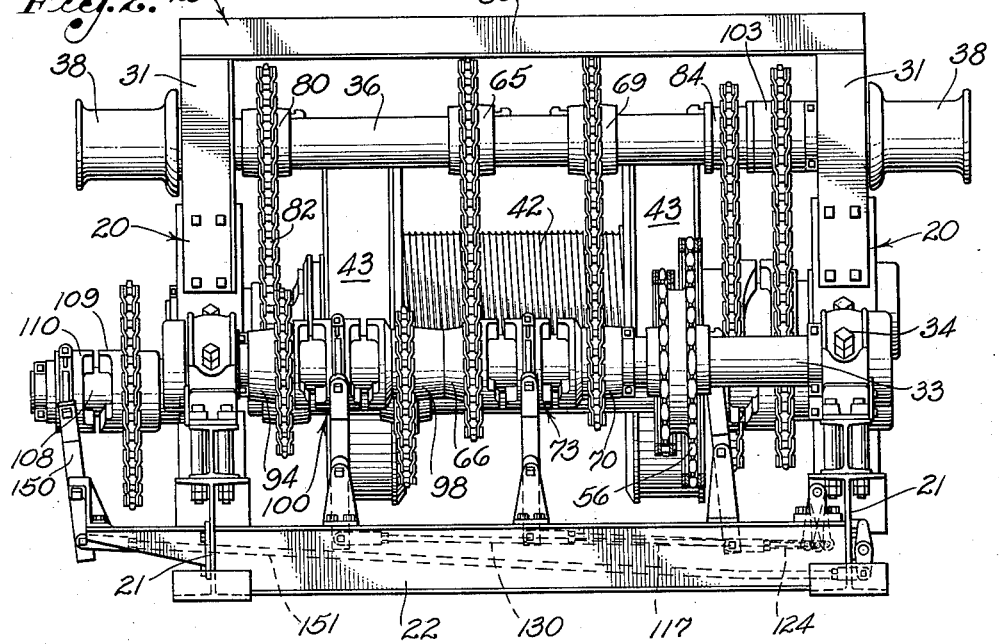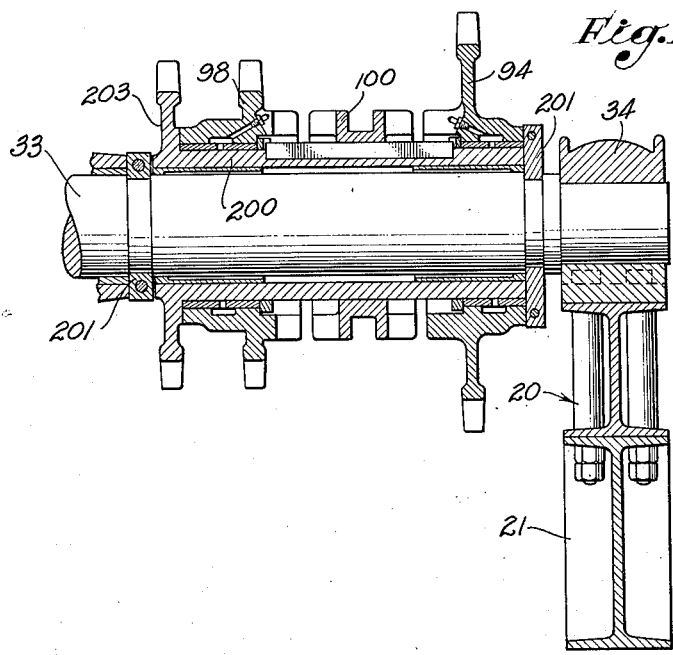

April 3, 1934. W. D. DAVIDSON 1,953,339
DRAW WORKS
Filed July 12, 1932   6 Sheets-Sheet 4
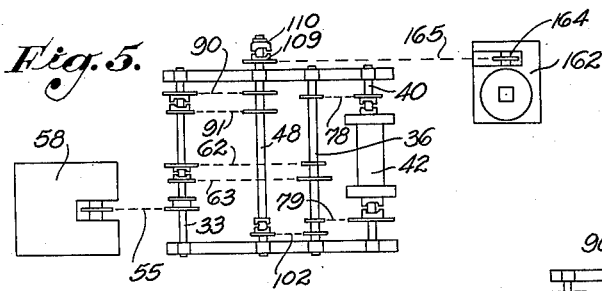
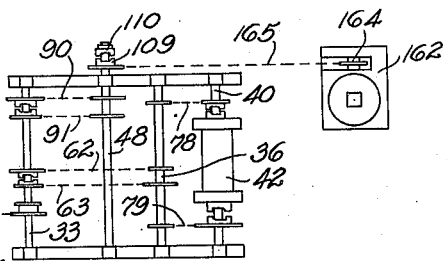
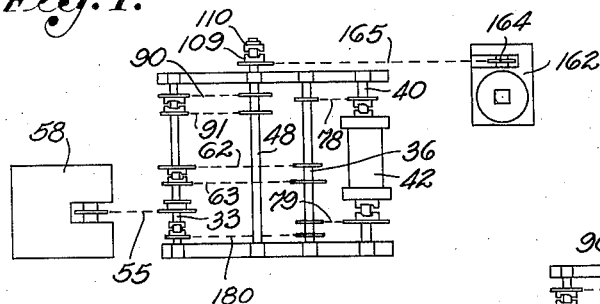
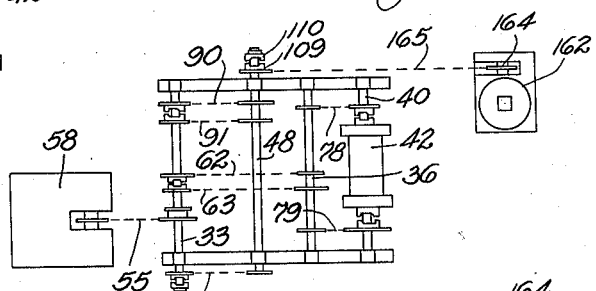
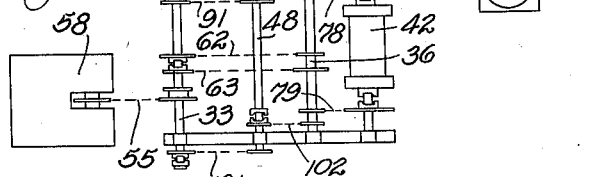
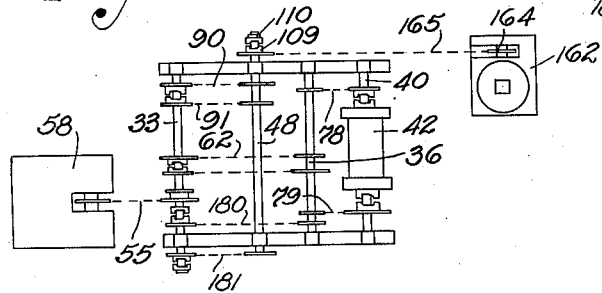
INVENTOR:
William D. Davidson,
By
*Fad Adair*
ATTORNEY.

April 3, 1934. W. D. DAVIDSON 1,953,339
DRAW WORKS
Filed July 12, 1932 6 Sheets-Sheet 5
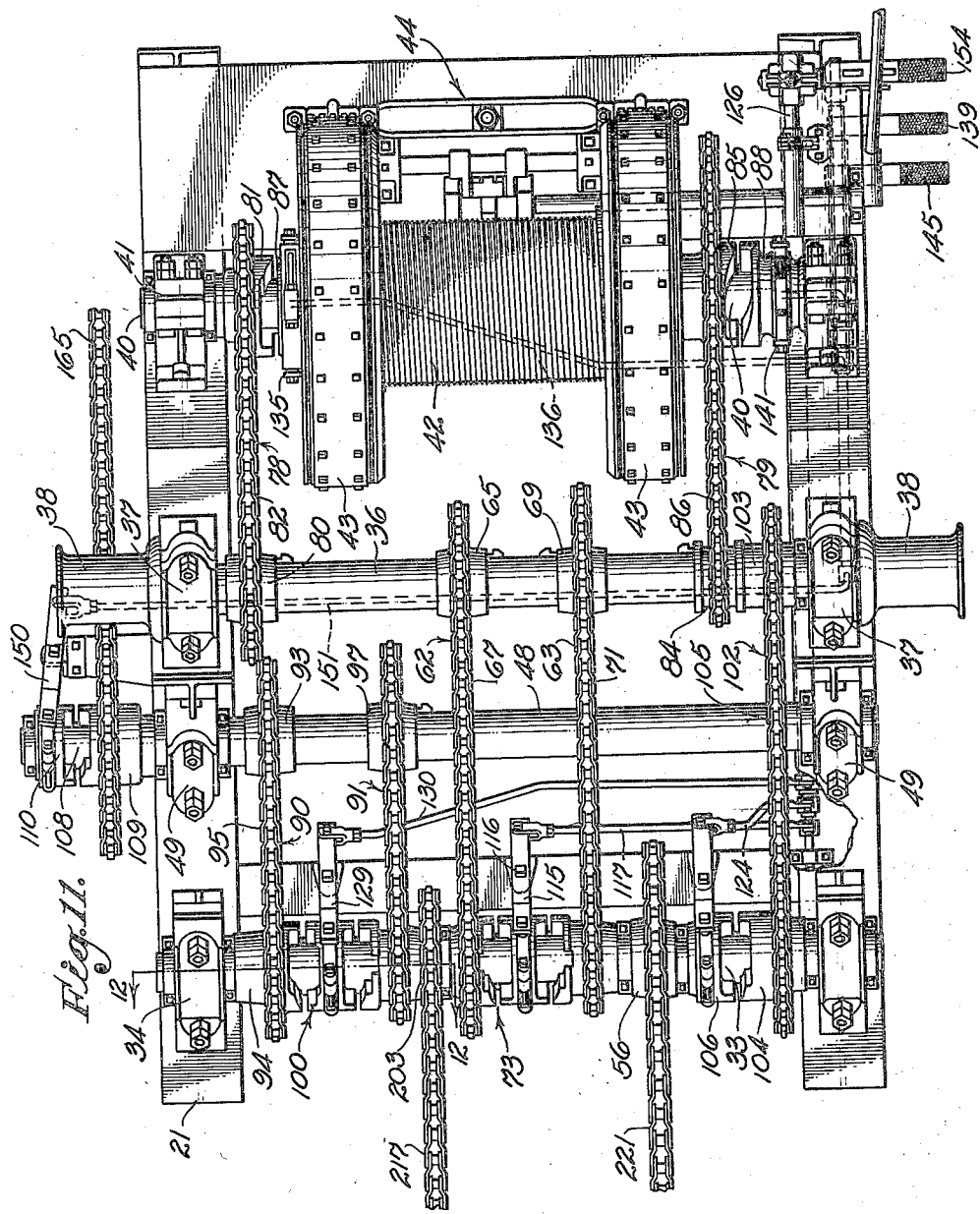
INVENTOR:
William D. Davidson,
BY
ATTORNEY.

April 3, 1934.  W. D. DAVIDSON  1,953,339
DRAW WORKS
Filed July 12, 1932  6 Sheets-Sheet 6
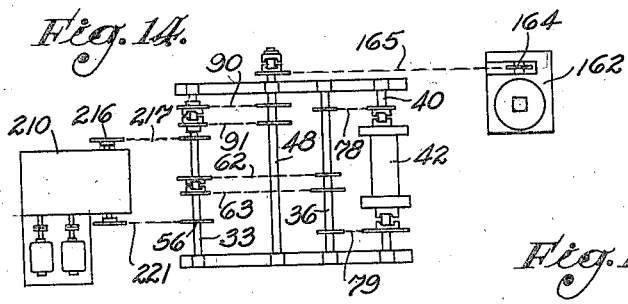
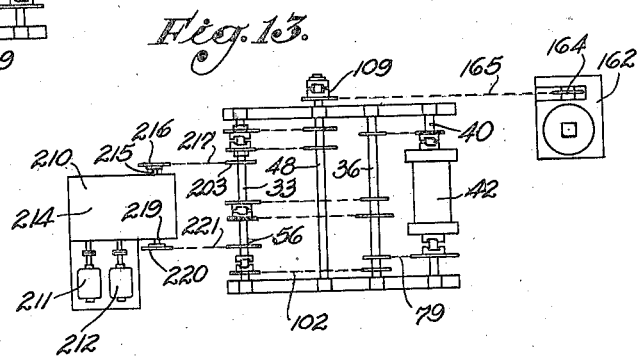
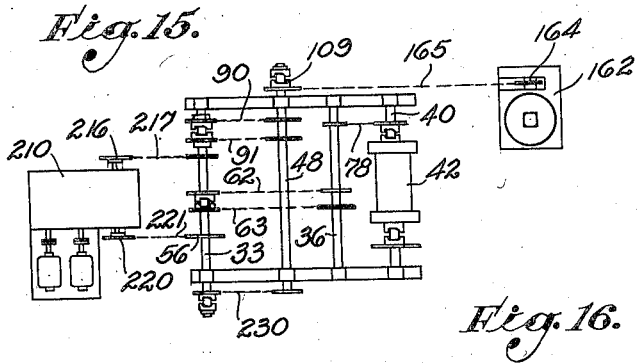
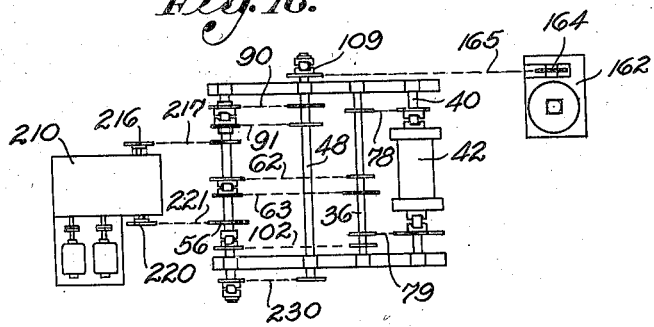
INVENTOR:
William D. Davidson,
By
ATTORNEY.

Patented Apr. 3, 1934

1,953,339

UNITED STATES PATENT OFFICE 1,953,339

DRAW WORKS

William D. Davidson, Los Angeles, Calif., assignor to Emsco Derrick & Equipment Company, Los Angeles, Calif., a corporation of California Application July 12, 1932, Serial No. 622,056

21 Claims. (Cl. 255—19)

My invention relates to the oil producing industry, and relates particularly to a draw works which is employed in derricks for hoisting various tools, well casing and drill pipe, and for operating the rotary machine.

In order that the advantages of my present invention may be appreciated upon reading the following detailed descriptions thereof, I will briefly point out the present drilling conditions and the needs which are satisfied by my invention. At the present time it is common practice to drill a well to a depth of 7000 or 8000 feet. Drilling to such depth requires heavy apparatus which is able to transmit and withstand great forces. The hoisting apparatus in the derrick of the well is called upon to handle very heavy loads and it is also called upon to handle relatively light loads. As a matter of economy, it is desirable to hoist the various tools, casings and drill pipe with as high speed as is practically possible in order to reduce the time required for inserting these parts into the well and withdrawing same from the well as the situation requires.

When a well has been drilled to a considerable depth, the drill pipe is very heavy and requires considerable power to elevate same. It is necessary at frequent intervals to withdraw the drill pipe for the purpose of sharpening or replacing the bit secured to the lower end thereof. The drill pipe is withdrawn from the well by use of hoisting apparatus which includes a draw works construction. The draw works has a drum on which a cable is wound, this cable extending around a crown-block at the top of the derrick and being connected to a traveling block which supports an elevator, this elevator in turn engaging the drill pipe during the raising operations. Taking a specific example, considerable power is required when the drill pipe is 6000 feet long. As this drill pipe is gradually withdrawn from the well, its length is shortened. When 2000 feet has been removed from the drill pipe and it is only 4000 feet long, less power is required to elevate the drill pipe. This required power to raise the drill pipe gradually diminishes to a minimum when the last length of drill pipe is withdrawn from the well. It is of course impractical to replace the prime mover at different times during the raising of a drill pipe, and it would be uneconomical to provide a very powerful and expensive prime mover which would be capable of exerting sufficient power to raise the drill pipe at a high rate of speed even when the drill pipe is 6000 feet long.

It is highly desirable in a draw works construction to have a plurality of speed ratios whereby the drum may be driven at different rates of speed. Obviously, when the drum is driven at a slow rate of speed, the power transmitter therethrough is greatest, and when the drum is driven at a high rate of speed, the power transmitted therethrough is least. By properly operating a draw works and using the suitable drive ratios it is possible for an operator to gradually increase the speed at which the drill pipe is withdrawn in accordance with the shortening of the drill pipe and the lessening of the weight thereof. In other words, as the drill pipe becomes shorter, less power is required to elevate it, and therefore a higher speed of the drum may be employed.

In the present type of draw works which utilizes three shafts, the speed ratios are inadequate to supply present drilling needs. It is therefore impossible to withdraw the drill pipe from the well on the most economical basis. In view of an inadequate number of drives to the drum having different speed ratios, the driller is compelled to raise the drill pipe slower than he would be required to do if additional drives were provided. The driller cannot change from one drive to another until the load has sufficiently diminished so that the next drive will not overtax the engine. The present draw works creates a tendency on the part of the driller to overtax drilling apparatus by operating the prime mover under excessive loads or by operating the apparatus at excessive speeds, which he is required to do because of the lack of an adequate number of driving means having proper gear ratios.

It is an object of my present invention to provide a draw works having great flexibility and in which the drum may be driven at quite a number of different speeds. This will enable the operator to change drive means more often during the raising of a load and thus take advantage of the reduction of load and raise the load at the maximum rate of speed. All of this may be done without overtaxing the hoisting apparatus or the prime mover.

A further object of my invention is to provide a draw works which constitutes a self-contained unit and which includes within itself all of the mechanism required for its operation.

A still further object of my invention is to provide a very rigid two-post or two-frame draw works.

It is also an object of my invention to provide a draw works having four shafts including a countershaft for driving the rotary machine of the derrick, which countershaft is located behind or outside of the drum shaft and close to the floor of the derrick. This countershaft preferably extends entirely across the draw works, and is supported in bearings carried by the two-post or two-frame arrangement which supports the other shafts of the draw works.

Another object of my invention is to provide a draw works in which it is not necessary to operate the line shaft and the drum shaft during drilling operations and in which it is not necessary to operate the countershaft during hoisting operations.

It is a still further object of my invention to provide a rotary draw works in which the elements are particularly designed so that additional drive means between the various shafts may be added with convenience in order to provide additional driving speeds for the drum or for the rotary machine. In the draw works of my invention the parts are designed so that there is ample room for additional drive means without, however, sacrificing the desired compactness.

It is a still further object of my invention to provide a draw works having various characteristics pointed out in the foregoing paragraphs in which the draw works may be operated by a differential drive device such as the well-known Hild drive.

It is also an object of my invention to provide a draw works adapted for use in conjunction with a differential drive in which there is a sleeve positioned on the jack shaft which is driven by the differential drive and which constitutes an additional shaft surrounding the jack shaft of the apparatus.

My invention is included in the draw works disclosed in the accompanying drawings. These draw works include the various features of my invention which cooperate to produce a draw works which I believe to be superior in many respects to draw works on the market at the present time. My invention includes many features which are susceptible of independent use and have a value in draw works independent of their value in connection with all of the features of my invention. I therefore wish to assert that I believe my invention to consist not only in the entire combination to be disclosed hereinafter, but to inhere in various combinations and subcombinations of the entire draw works; and it is therefore my intention to claim all patentable combinations and subcombinations to which I am entitled.

I will now refer to the accompanying drawings and describe the essential features of my invention.

In the drawings:

Fig. 2 is a rear view of Fig. 1 taken as indicated by the arrow 2.

Fig. 5 is a diagrammatic plan view of the draw works shown in Figs. 1 to 4 inclusive, this view diagrammatically illustrating the manner in which the various parts are associated together.

Figure 1:
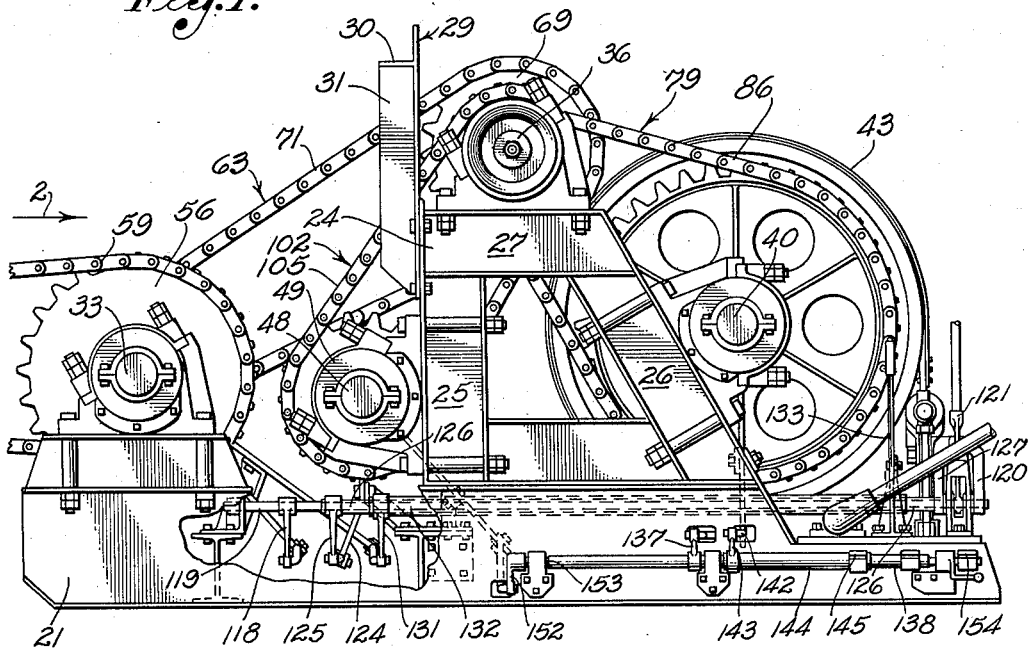
Fig. 1 is an elevational side view.

Figs. 6, 7, 8, 9, and 10 are diagrams similar to Fig. 5 showing the manner in which the basic structure of my invention may be modified to include different driving means for the drum thereof and for the draw works.

Fig. 11 is a plan view of a draw works similar to that shown in the preceding figures in which the parts are adapted for use in connection with a differential drive device.

Fig. 12 is a fragmentary section taken along the jack shaft, as indicated by the line 12—12 of Fig. 11.

Fig. 13 is a diagrammatic view similar to the diagrammatic views 5 to 10 inclusive, and constitutes a plan view of the draw works shown in Figs. 11 and 12.

Figs. 14, 15, and 16 are diagrams similar to Fig. 13 illustrating the various drive means which may be included in this particular type of draw works illustrated in Figs. 11, 12, and 13.

I will refer to the drawings in detail and describe my invention. The first form of my invention which I will describe is the form shown in Figs. 1 to 5 inclusive. Reference will therefore be had to these views in the following detailed description.

The supporting structure of my invention includes two-frame or two-post constructions 20, each of which is substantially the same in construction except that one is a left-hand and the other is a right-hand construction since they are used at the opposite sides of the draw works. Each post construction 20 includes an I-beam 21 which is designed for resting upon a supporting structure such as foundations or a derrick floor. These I-beams 21 are suitably connected together so that a rigid construction is provided. The connecting means is provided in the form of cross-braces, such as cross-beams 22. Each post construction 20 includes an upright structure which is designated in general by the numeral 24. Each upright structure 24 includes a vertical back member 25, a rearwardly and upwardly inclined front member 26, and a horizontal top member 27. These members 25 to 27 inclusive may be made from any suitable type of structural member such as an I-beam as shown. The upright structures 24 are rigidly secured to the I-beams 21 so as to be a rigid and integral part thereof. For the purpose of rigidifying the structure just disclosed, and particularly for the purpose of rigidifying the upright structures 24 I provide an inverted U-shaped brace 29 which has a horizontal part 30 which extends laterally across the draw works and at each end thereof a depending leg 31. Each depending leg 31 is connected to the upper part of one of the upright structures 24, as disclosed clearly in Figs. 1 and 2.

I will next describe the four shafts of the draw works and their positions with respect to the supporting structure just described. These shafts are particularly arranged, as will be pointed out in the ensuing description, to facilitate the use of a plurality of drives for the drum of the draw works and for the rotary machine which is driven by the draw works.

The numeral 33 represents the jack shaft of my invention. This jack shaft 33 extends in a horizontal plane across the draw works in a position close to the rear part thereof. In fact, this jack shaft is located at the rearward end of the supporting structure. The jack shaft 33 is rotatably supported by bearings 34 which are preferably of the self-aligning type and which are mounted on the rearward ends on the I-beams 21.

The numeral 36 represents the line shaft of my invention. This line shaft extends parallel to the jack shaft 33, but is mounted in a position forward of the jack shaft and in a much higher position in the draw works. This line shaft is supported by bearings 37 mounted on the top members 27 of the upright structures 24. The ends of the line shaft 36 project outwardly beyond the post constructions 20 and have catheads 38 mounted on these extending ends.

The numeral 40 represents the drum shaft of my invention. This drum shaft 40 extends parallel to the other shafts of the draw works and is positioned in a plane in front of the line shaft 36 but in a lower plane. In fact, the drum shaft 40 is in a horizontal plane but slightly above the horizontal plane in which the jack shaft 33 is positioned. This drum shaft 40 is rotatably supported by bearings 41 which are secured to the front inclined members 26 of the upright structures 24. This drum shaft carries a drum 42 of a conventional type on which the hoisting cable may be wound. The drum 42 in accordance with usual practice has brake constructions 43 arranged at the ends thereof which are operated by suitable brake operating mechanism 44 which is constructed and which operates in any well-known manner.

The numeral 48 represents the countershaft of my invention. This countershaft, like the other three shafts previously described, extends in a horizontal plane across the draw works and is therefore parallel to these other shafts. The countershaft is positioned in front of the jack shaft 33 but to the rear of the drum shaft 40. This countershaft 48 is positioned in a horizontal plane which is relatively low on the supporting structure of the draw works in order that it may be near the floor of the derrick. This countershaft 48 is rotatably supported by bearings 49 which are secured to the back members 25 of the upright structures 24.

I will now describe the different drive means of my invention by which power is transmitted to and through the jack shaft 33, the line shaft 36, the drum shaft 40, and the countershaft 48.

The jack shaft 33 is driven by a jack shaft drive means 55 which includes a sprocket 56 rigidly mounted on the jack shaft 33, a sprocket 57 which constitutes a part of any suitable prime mover 58, and a sprocket chain 59 which extends around the sprockets 56 and 57. Whenever the prime mover 58 is in operation the jack shaft 33 will be rotated by the jack shaft drive means 55.

The line shaft 36 may be driven by the jack shaft 33 by means of a primary line shaft drive means 62 or a secondary line shaft drive means 63. The terms "primary" and "secondary" are not used in the sense of one drive being subsidiary to the other but these terms are employed for identifying the two drive means which connect the jack shaft 33 and the line shaft 36. The primary line shaft drive means 62 includes a sprocket 65 rigidly mounted on the line shaft 36, a sprocket 66 rotatably mounted on the jack shaft 33, and a sprocket chain 67 which extends around the sprockets 65 and 66. The secondary line shaft drive means 63 includes a sprocket 69 rigidly mounted on the line shaft 36, a sprocket 70 rotatably mounted on the jack shaft 33, and a sprocket chain 71 which extends around the sprockets 69 and 70. For the purpose of causing the jack shaft 33 to drive either of the rotatable sprockets 66 or 70, I provide a single clutch element 73 which surrounds the jack shaft 33 between the sprockets 66 and 70, and which is slidable into engagement with either of these rotatable sprockets 66 or 70.

Figure 3:
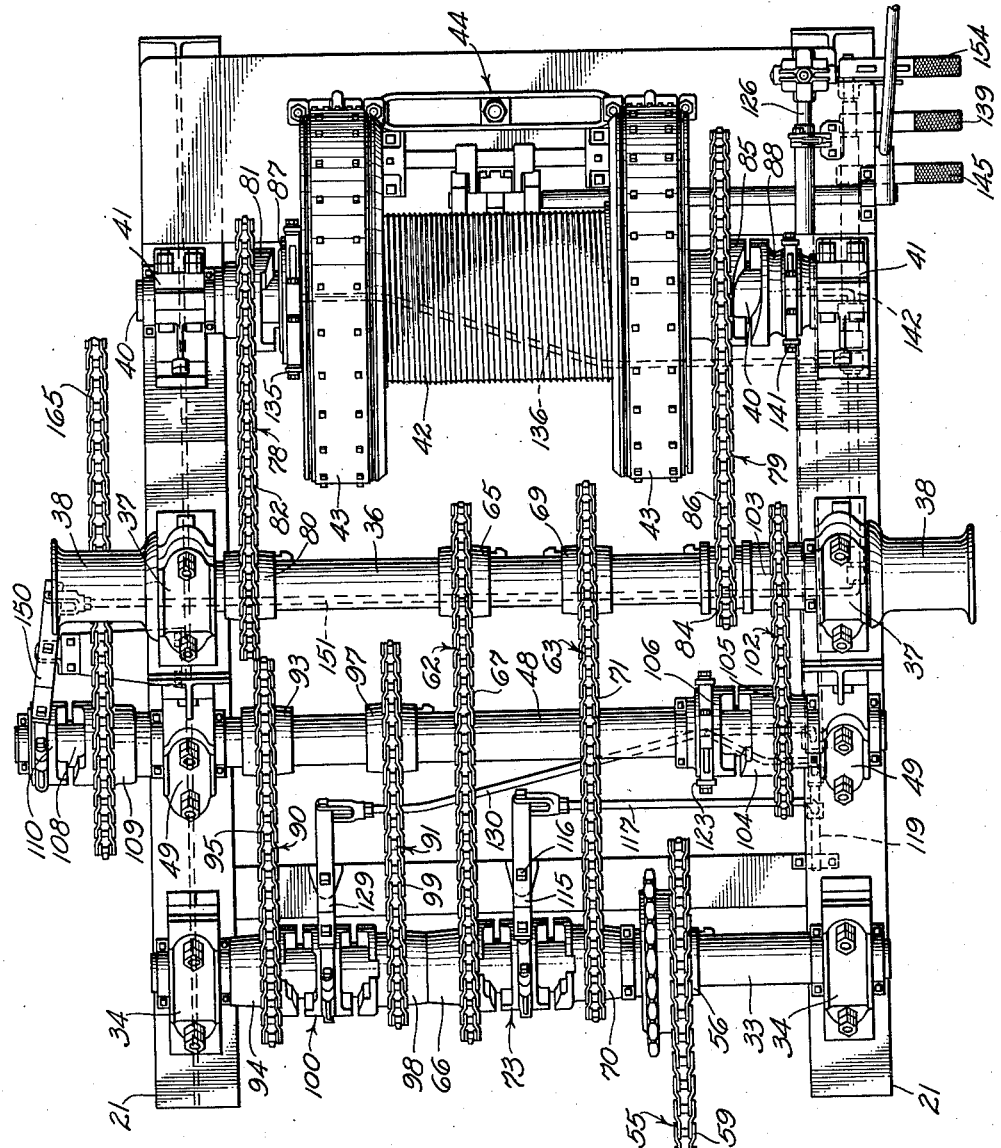
Fig. 3 is a plan view of Fig. 1.

The line shaft 36 is adapted to drive the drum shaft 40 by means of a primary drum shaft drive means 78 and a secondary drum shaft drive means 79 which are positioned directly inside the post constructions 20, as shown best in Fig. 3. The primary drum shaft drive means includes a sprocket 80 rigidly secured to the line shaft 36, a sprocket 81 rotatably mounted on the drum shaft 40, and a sprocket chain 82 extending around these two sprockets. The secondary drum shaft drive means includes a sprocket 84 rigidly secured to the line shaft 36, a sprocket 85 rotatably mounted on the drum shaft 40, and a sprocket chain 86 which extends around these two sprockets 84 and 85. The rotatable sprocket 81 may be brought into driving engagement with the drum shaft 40 by the operation of a clutch element 87, and the rotatable sprocket 85 may be brought into driving engagement with the drum shaft 40 by the operation of a clutch element 88.

The countershaft 48 is adapted to be driven from the jack shaft 33 by means of a primary countershaft drive means 90 and a secondary countershaft drive means 91. The primary countershaft drive means 90 includes a sprocket 93 rigidly secured to the countershaft 48, a sprocket 94 rotatably mounted on the jack shaft 33, and a sprocket chain 95 which extends around these two sprockets. The secondary countershaft drive means 91 includes a sprocket 97 rigidly mounted on the countershaft 48, a sprocket 98 rotatably mounted on the jack shaft 33, and a sprocket chain 99 which extends around these two sprockets. The two countershaft drive means 90 and 91 are positioned adjacent each other, and the two rotatable sprockets 94 and 98 have positioned between them a slidable clutch element 100 which is slidable on the jack shaft 33 to cause either the sprocket 94 or the sprocket 98 to be driven by the jack shaft 33.

In the form of my invention which I am now describing I provide an auxiliary or tertiary line shaft drive means 102 whereby the countershaft 48 may be utilized to drive the line shaft 36. This tertiary line shaft drive means 102 is positioned immediately inside one of the post constructions 20, as shown best in Fig. 3. This drive means 102 includes a sprocket 103 rigidly mounted on the line shaft 36, a sprocket 104 rotatably mounted on the countershaft 48, and a sprocket chain 105 which extends around these sprockets. Adjacent the rotatable sprocket 104 is a slidable clutch element 106 which is operable to provide a driving engagement between the sprocket 104 and the countershaft 48 whereby the tertiary line shaft drive means 102 may be operated to rotate the line shaft 36.

One end 108 of the countershaft 48 projects beyond the supporting means and rotatably mounted on this projecting end is a rotary drive sprocket 109. This sprocket 109 may be locked on the countershaft 48 by suitable operation of a clutch element 110.

I will next describe the clutch control means whereby the various clutch elements 73, 87, 88, 100, 106, and 110 may be operated.

The control means for the clutch element 73 includes a yoke member 115 associated with the clutch element 73 which is pivoted at 116 so that it may be caused to slide the clutch element 73 on the jack shaft 33 when this yoke member 115 is operated by means of a rod 117. This rod 117 is connected to a lever 118 which is secured to a rotatable shaft 119. This shaft 119 is supported on one of the I-beams 21, as shown in Figs. 1, 2, and 3. The forward end of the shaft 119 terminates at the forward part of the draw works and is provided with an arm 120 which is engageable by an operating lever 121. This operating lever 121 functions on the principle of a selective transmission device and may be moved in such a manner that the arm 120 may be engaged and thereafter moved in order to slide the clutch element 73 either into engagement with the sprocket 66 or the sprocket 70.

The clutch element 106 is operated by a yoke member 123 which is connected by a rod 124 and a lever 125 to a hollow shaft 126 which surrounds the shaft 119. The hollow shaft 126 terminates at the front part of the draw works and has an arm 127 connected thereto which is positioned opposite the arm 120. This arm 127 is intended to be operated by the operating lever 121. The operating lever 121 may be made to engage the arm 127 and to operate the clutch element 106. It will be seen that it is impossible for the operating lever 121 to operate both the arms 120 and 127 at the same time, and it is therefore impossible to engage the clutch element 73 and the clutch element 106 at the same time. This precaution is necessary to prevent either the primary or secondary line shaft drive means 62 and 63, or the tertiary line shaft drive means 102, from being drivably connected at the same time.

The clutch element 100 is operated by a yoke member 129 which is connected by a rod 130 to a lever 131 which is in turn secured to a tubular shaft 132 which surrounds the tubular shaft 126. This tubular shaft 132 is provided with an operating lever 133 by means of which the clutch control means for the clutch element 100 may be operated to cause this clutch element 100 to engage either the sprocket 94 or the sprocket 98.

The clutch element 87 is operable by a clevis 135 which is connected to a rod 136. The rod 136 is connected by a lever 137, shown in Fig. 1, to a hollow shaft 138 mounted on one of the I-beams 21. Joined to the forward end of this hollow shaft 138 is a foot pedal 139 whereby same may be rotated.

The clutch element 88 is operated by a yoke member 141 which is connected by a rod 142 to a lever 143, shown in Fig. 1, which lever is secured on a hollow shaft 144 which surrounds the hollow shaft 138. On the forward end of this hollow shaft 144 there is secured a pedal 145 whereby same may be operated.

The clutch element 110 is operated by a yoke member 150 which is connected by a rod 151 and a lever 152 to a shaft 153 shown in Fig. 1. This shaft 153 extends through the hollow shaft 138 and has a pedal 154 secured to its forward end whereby the shaft may be rotated.

The various clutch control means operate on principles which are well understood and a detailed description is unnecessary. Each different control means for each different clutch element is operable to slide its associated clutch element into and out of engagement with the sprocket or sprockets as the case may be with which it is associated.

Figure 4:
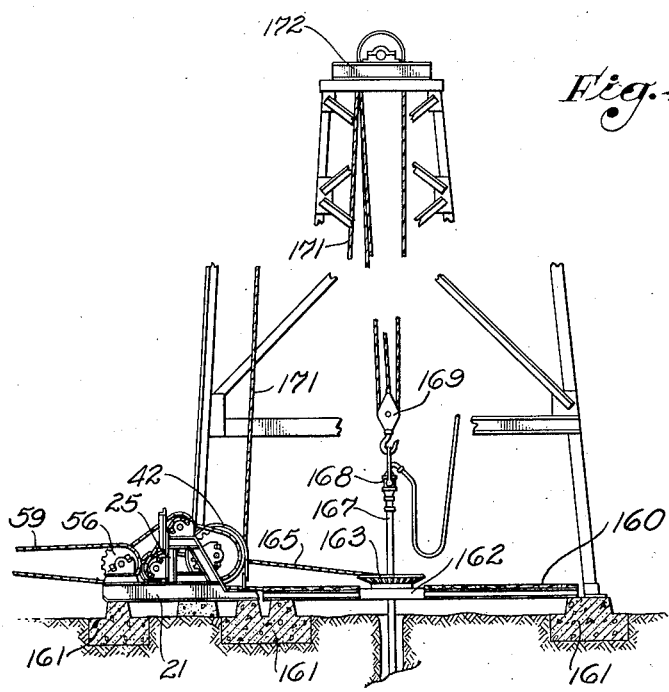
Fig. 4 is a diagrammatic view illustrating the utility of my invention.

In Fig. 4 I have illustrated the utility of my invention. In this figure the numeral 160 represents the floor of a derrick. At the left side of the derrick floor are provided foundations 161 on which the draw works of my invention is supported. This draw works is preferably secured in place by suitable anchor bolts which rigidly mount same. The draw works, it will be noted, does not have any connection to the vertical legs or cross-bracings of the derrick, but is solely supported by the floor of the derrick and by the foundations 161. At the center of the derrick there is provided a rotary machine 162 having a table 163 which is operated by means of a rotary machine sprocket 164. Extending over this rotary machine sprocket 164 and the rotary drive sprocket 109 is a sprocket chain 165. Adapted to be driven by the table 163 is a drill pipe 167 having a swivel 168 at its upper end. This swivel 168 is supported by a traveling-block 169, which traveling-block is carried by a cable 171 which is wound around sheaves of the traveling-block 169 and sheaves of a crown-block 172 positioned at the top of the derrick. The cable 171 extends from the crown-block 172 and is wound on the drum 42.

During drilling operations the rotary table is rotated in order that the drill pipe 167 and the bit or core barrel associated therewith may be rotated. At this time the prime mover 58 drives the jack shaft 33 by the jack shaft drive means 55. The countershaft 48 is driven from the jack shaft 33 by the primary or secondary countershaft drive means 90 or 91, depending on whether a high or low speed is desired. The sprocket 109 is at this time connected to the countershaft 48 by a proper positioning of the clutch element 110, and the rotary table 163 is therefore operated by means of the sprocket chain 165 and the rotary machine sprocket 164. It will be noted that the line shaft 36 or the drum shaft 40 and associated parts are not operated at this time. Furthermore, the primary and secondary line shaft drive means 62 and 63 are not operated due to the fact that the jack shaft 33 rotates relative to the sprockets 66 and 70 of these line shaft drive means 62 and 63.

When hoisting operations are to be performed, the clutch element 100 which is engageable with either the sprockets 94 or 98 of the countershaft drive means 90 or 91 is returned to a neutral position in order that the countershaft 48 be not rotated. The operator then engages the clutch element 73 with either of the sprockets 66 or 70 which causes a driving of the line shaft 36 through either the line shaft drive means 62 or 63. The operator furthermore engages the clutch elements 87 or 88 so that either the drum shaft drive means 78 or 79 will rotate the drum shaft from the line shaft. If desired, the line shaft 36 may be driven from the countershaft 48. This is accomplished by placing the clutch element 73 in neutral position and engaging either of the sprockets 94 or 98 with the clutch element 100. The clutch element 106 is then brought into engagement with the sprocket 104 and the clutch element 110 is disengaged from the sprocket 109 so that the countershaft 48 will rotate relative to the sprocket 109 and the rotary table will not be operated at this time.

In the form of my invention disclosed in Figs. 1 to 5 inclusive, the rotary table of the rotary machine may be operated at two speeds, and the drum 42 may be operated at eight speeds. In hoisting loads it is possible for the operator of the apparatus to choose the drive means which has adequate power to handle the load and which has the maximum speed. As the load decreases, another drive means may be selected in order that additional speed may be obtained. This enables the operator to hoist the pipe or other equipment with the greatest possible speed.

I believe it is apparent from the foregoing description of this form of my invention that there are numerous advantages and special features in my draw works not present in prior art constructions. In the first place, the large number of drum drives permits high power and low speeds to be used for heavy loads, such as for handling a very long drill pipe; and higher speeds and less power for lighter loads. From the foregoing description the necessity and desirability of a large number of speeds should be quite obvious. Not only are these speeds conducive to economy of time but they also eliminate excessive speeds and loads being imposed upon the prime mover. Whenever a load is too heavy for the prime mover and such is noticeable by the manner in which the prime mover is functioning, the operator may very easily change the different drive means so that a more powerful gear ratio may be obtained. Likewise, when it is apparent that the load has lightened and that the prime mover is speeding up, the operator may then choose a less powerful driving connection in order that the load may be raised at a higher rate of speed without requiring the prime mover to be operated at higher speeds than are desirable.

It is further apparent from the foregoing description that the rotary machine of my invention provides a plurality of drives for the rotary machine. This permits the driller to use one speed for drilling operations and another speed for coring, it being well-known that core barrels operate better when rotated at a slower rate of speed than is ordinarily used for regular drilling.

One of the important features of my invention is that during the drilling it is not necessary to operate the line or drum shaft. It is only necessary to operate the jack shaft 33 and the countershaft 48. During hoisting operations the countershaft 48 is not driven unless it is desired to utilize the auxiliary or tertiary drive means 102. This is a highly desirable feature, since it eliminates the moving of parts which are not necessary and thus reduces wear and conserves power.

A further advantage of my present invention is the positioning of the countershaft 48 close to the floor of the derrick in order that the sprocket chain 165, which extends from the draw works to the rotary machine may extend close to the floor of the derrick and not take up too much space. It is possible to put a relatively low guard over the sprocket chain 165 to protect the workmen, and workmen on the floor of the derrick may step over the guard and may then cross the derrick without being required to go in a roundabout path around the rotary machine.

My invention is particularly designed to reduce the vibration which is imparted to the derrick structure. This I accomplish by eliminating any headboard attachments between the draw works and the derrick. The draw works is entirely supported by the floor of the derrick and by the foundations 161 shown in Fig. 4. Any vibration is therefore transmitted directly through the foundations to the ground and is not transmitted through the derrick construction.

A further feature and advantage of my invention is that the draw works includes but two supports or post constructions 20. This enables all of the apparatus with the exception of the sprocket 109 and the clutch element 110 to be positioned between the post constructions. It further enables the shafts to extend entirely across the draw works and to be supported by two bearings. In certain types of draw works on the market at the present time, three posts are used and certain of the shafts are supported by three bearings. In apparatus of the character of the draw works where the forces handled are enormous, it is impossible to maintain bearings in alignment. Any disalignment of one of the three bearings will cause undue wear and ultimate failure of the bearings long before their normal life has expired. In my invention I prefer to use self-aligning bearings and since only two bearings are used, these bearings automatically align themselves with the various shafts and rotatably support these shafts without any disalignment or without any binding or twisting action which would produce undue wear.

It will further be observed that the draw works of my invention is a self-contained unit. All of the parts which go to make up the draw works are supported by the supporting structure. The controls for the various clutches as well as the brake operating means 44 are entirely and fully supported by the framework of the draw works. In the different types of draw works with which I am familiar, it is usually necessary to connect the brake mechanism directly to the derrick and also to connect a part of the clutch control means to the derrick. By providing a self-contained construction I provide a very compact construction, one which is installed with but a minimum of labor and one in which the various parts are all strongly supported. This strong support is particularly desirable with respect to the brake control mechanism 44 in which great forces are imposed during the operation of the draw works.

Probably the most important feature of my invention is the particular arrangement of the shafts. It will be noted that the jack shaft 33 is mounted directly on the I-beams 21 and that the countershaft 48, the line shaft 36, and the drum shaft 40 are mounted on the upright structures 24. All the shafts extend entirely across the draw works and the two supports 20 are sufficient to support all of the shafts. The countershaft 48 is placed in back of the drum shaft 40 where there is an adequate space provided, and the extending of this countershaft entirely across the draw works enables a plurality of drives between the jack shaft and the countershaft and a drive between the countershaft and the line shaft. By this peculiar arrangement of shafts, it is possible to obtain multiple driving means which are so highly advantageous in the drilling of deep wells.

In Figs. 6 to 10 inclusive I have illustrated various arrangements of driving means in order that it may be readily seen how the draw works of my invention peculiarly adapts itself to various numbers and types of drives between the different shafts.

Fig. 6 is identical with Fig. 5 except that the auxiliary or tertiary drive means 102 is eliminated. In this type of draw works there are two speeds to the rotary machine and four speeds to the drum. In the form of the invention shown in Fig. 7 the various drives are the same as shown in Fig. 6, except that an additional line shaft drive means 180 is provided between the jack shaft 33 and the line shaft 36. In this type of draw works the rotary machine has two speeds and the drum has six speeds.

In the form of the invention shown in Fig. 8 the drives as utilized in Fig. 6 are provided, but there is an additional countershaft drive means 181 whereby the jack shaft 33 may drive the countershaft 48. This additional drive means 181 is located outside the post construction and is easily provided merely by providing a jack shaft and a countershaft which are slightly longer than those provided in the other forms of my invention. In this type of draw works the rotary machine has three speeds and the drum has four speeds.

In the form of my invention shown in Fig. 9 the various drives as utilized in Fig 5 are employed and in addition the drive 181 employed in Fig. 8 is also used. In this form of my invention there are three speeds for the rotary machine and ten speeds for the drum.

The form of my invention shown in Fig. 10 utilizes the drives shown in Fig. 7 and also the drive 181 shown in Fig. 8. In this form of my invention the rotary machine has three speeds and the drum has six speeds.

I will now describe the form of my invention which is particularly adapted for use in conjunction with a differential drive device, such as the Hild drive. The constructions of the regular draw works as shown in detail in Figs. 1, 2, and 3, and the differential drive draw works, as shown in Figs. 11 and 12, are almost identical. The four shafts 33, 36, 40, and 48 are placed in the same positions and the driving connections between these shafts are substantially the same. The various parts which are the same in the differential drive draw works as those in the regular type of draw works will be employed in order that a detailed description which would merely be a substantial duplicate of the preceding detailed description will not be necessary, and in order that the comparison between the two devices may readily be seen by observing the corresponding parts represented by the corresponding numerals.

As shown in Fig. 12, this form of my invention provides a sleeve 200 which is rotatably mounted on the jack shaft 33. This sleeve is prevented from longitudinal movement by means of collars 201 which are secured to the jack shaft 33 at opposite ends of the sleeve. In this form of my invention the sprockets 94 and 98 and the clutch element 100 are not directly mounted on the jack shaft 33 but are mounted on the sleeve 200 as shown. The sprockets 94 and 98 therefore are never driven by the jack shaft 33 but are always driven by means of the sleeve 200. By sliding the clutch element 100 in either direction upon operation of the control mechanism, either the sprocket 94 or the sprocket 98 is drivably connected to the sleeve 200, which sleeve 200 may rotate on the jack shaft 33 entirely independent thereof. Supported at one end of the sleeve 200 and preferably formed integrally therewith is a differential drive sprocket 203 which, as will be pointed out hereinafter, is adapted to be driven by a differential drive device.

Another difference between the two devices is that on the differential drive device there is no driving connection between the countershaft 48 and the line shaft 36. This driving connection has been eliminated due to the fact that in using a differential drive device the rotary drive and the drum must be operated simultaneously and independently of each other. This could not be done if there were a driving connection between the countershaft 48 and the line shaft 36. In this type of my invention which I am now describing, the auxiliary or tertiary drive means 102 is still utilized but the sprocket 104 is rotatably mounted on the jack shaft 33 in place of being rotatably mounted on the countershaft 48. Likewise the clutch element 106 is moved back to the jack shaft 33 so that it may be operated in conjunction with the sprocket 104.

As shown in the diagrammatic view, Fig. 13, the numeral 210 represents a differential drive device which may be of any operable construction. For the purpose of representation I have shown a differential device which employs motors 211 and 212 which are connected to a differential gear box 214. Extending from the differential gear box 214 is a shaft 215 having a sprocket 216 mounted thereon. Extending around this sprocket 216 and the sprocket 203 is a sprocket chain 217 whereby the sleeve 200 is rotated. Also extending from the differential gear box 214 is a shaft 219 having a sprocket 220 secured thereto. A sprocket chain 221 extends around the sprocket 220 and the sprocket 56 mounted on the jack shaft 33.

In the operation of this form of my invention the drives are connected so that the jack shaft 33 will drive the line shaft 36, and the line shaft 36 will drive the drum shaft 40 on which the drum 42 is placed. The clutch element 100 is likewise suitably positioned so that the sleeve 200 will drive the countershaft 48 which in turn drives the sprocket 109, this sprocket 109 causing an operation of the rotary machine 162 by the intercommunicating chain and sprocket 165 and 164. The differential drive device is so constructed that the rotary machine and drill pipe associated therewith are rotated so as to drill the well. It is also constructed in such a manner that the drum is controlled to feed the drill pipe downwardly as drilling progresses. The construction is such that a certain pressure of contact between the drill bit and the bottom of the hole is maintained. Should this pressure become too great, feeding of the drill pipe will be stopped or the drill pipe will be slightly raised to reduce this pressure. On the other hand, if the pressure of drilling becomes too light, the drum will be operated so as to feed the drill pipe downwardly in order to increase the drilling pressure as desired. This operation is performed automatically, and when the apparatus has been put into operation the drill pipe is automatically lowered as drilling operations continue. The construction and operation of the differential drive device of the character indicated herein are well-known in the art and a detailed description thereof or its principle of operation will not be necessary.

In Figs. 14, 15, and 16, I have illustrated other driving connections which may be employed in this form of my invention.

In the form of the invention shown in Fig. 14, the tertiary drive used in Figs. 11 to 13 has been eliminated. In Fig. 15 I have provided an auxiliary drive 230 between the jack shaft 33 and the countershaft 48. This drive 230 may be utilized when the differential drive device is not being operated to control the rate of feed of the drill pipe. In Fig. 16 I show a form of my invention which includes the various driving means shown in Fig. 13 and also includes the auxiliary drive 230 shown in Fig. 15.

Those skilled in the art will be able to practice my invention from the full and complete disclosure contained in the description and drawings. I have particularly illustrated the various driving connections which may be provided in the draw works of my invention in order that the utility of my invention may be readily appreciated and in order that those skilled in the art may readily see the manner in which my invention is readily adapted to utilize different driving arrangements. Each type of draw works which I have illustrated incorporates the essential features of my invention. It is likely that various other modifications may be made in the structure which embodies my invention without, however, departing from the spirit and scope thereof. I therefore do not wish my invention to be limited to any structural details or to any elements other than those which are defined in the appended claims.

I claim as my invention:

1. In a draw works of the class described, the combination of: a pair of frame constructions; a jack shaft, a line shaft, a drum shaft, and a countershaft supported by said pair of frame constructions, each of said shafts being parallel to each other and extending entirely across the draw works; a drum on said drum shaft; a rotary drive means on said countershaft; line shaft drive means whereby said jack shaft may drive said line shaft; drum shaft drive means whereby said line shaft may drive said drum shaft; countershaft drive means whereby said jack shaft may drive said countershaft; and jack shaft drive means whereby said jack shaft may be driven.

2. In a draw works of the class described, the combination of: a pair of frame constructions; a jack shaft, a line shaft, a drum shaft, and a countershaft supported by said pair of frame constructions, each of said shafts being parallel to each other and extending entirely across the draw works, said countershaft being situated between said jack shaft and said drum shaft; a drum on said drum shaft; a rotary drive means on said countershaft; line shaft drive means whereby said jack shaft may drive said line shaft; drum shaft drive means whereby said line shaft may drive said drum shaft; countershaft drive means whereby said jack shaft may drive said countershaft; and jack shaft drive means whereby said jack shaft may be driven.

3. In a draw works of the class described, the combination of: a pair of frame constructions; a jack shaft, a line shaft, a drum shaft, and a countershaft supported by said pair of frame constructions, each of said shafts being parallel to each other and extending entirely across the draw works, said jack shaft being situated in a rearmost position, said countershaft being in front of said jack shaft, said line shaft being in front of said countershaft, and said drum shaft being in front of said line shaft; a drum on said drum shaft; a rotary drive means on said countershaft; line shaft drive means whereby said jack shaft may drive said line shaft; drum shaft drive means whereby said line shaft may drive said drum shaft; countershaft drive means whereby said jack shaft may drive said countershaft; and jack shaft drive means whereby said jack shaft may be driven.

4. In the draw works of the class described, the combination of: a pair of frame constructions; a jack shaft, a line shaft, a drum shaft supported by said pair of frame constructions, each of said shafts being parallel to each other and extending entirely across the draw works, and a countershaft supported between said jack shaft and said drum shaft, said countershaft extending parallel to said other shafts and extending in back of said drum shaft; a drum on said drum shaft; a rotary drive means on said countershaft; line shaft drive means whereby said jack shaft may drive said line shaft; drum shaft drive means whereby said line shaft may drive said drum shaft; countershaft drive means whereby said jack shaft may drive said countershaft; and jack shaft drive means whereby said jack shaft may be driven.

5. In a draw works of the class described, the combination of: a pair of frame constructions; a jack shaft, a line shaft, a drum shaft supported by said pair of frame constructions, each of said shafts being parallel to each other and extending entirely across the draw works, and a countershaft supported between said jack shaft and said drum shaft, said countershaft extending parallel to said other shafts and extending in back of said drum shaft; a drum on said drum shaft; a rotary drive means on said countershaft; line shaft drive means whereby said jack shaft may drive said line shaft; drum shaft drive means whereby said line shaft may drive said drum shaft; countershaft drive means whereby said jack shaft may drive said countershaft; an auxiliary drive means whereby said countershaft may drive said line shaft; and jack shaft drive means whereby said jack shaft may be driven.

6. In a draw works of the class described, the combination of: a pair of frame constructions; a jack shaft, a line shaft, a drum shaft supported by said pair of frame constructions, each of said shafts being parallel to each other and extending entirely across the draw works, and a countershaft supported between said jack shaft and said drum shaft, said countershaft extending parallel to said other shafts and extending in back of said drum shaft; a drum on said drum shaft; a rotary drive means on said countershaft; line shaft drive means whereby said jack shaft may drive said line shaft; drum shaft drive means whereby said line shaft may drive said drum shaft; countershaft drive means whereby said jack shaft may drive said countershaft; an auxiliary drive means whereby said countershaft may drive said line shaft; control means for preventing said line shaft drive means and said auxiliary drive means from simultaneously driving said line shaft; and jack shaft drive means whereby said jack shaft may be driven.

7. In a draw works of the class described, the combination of: a pair of frame constructions, each having an upright structure including a back, a front, and a top member; a jack shaft mounted in a rearmost position on said frame construction, a countershaft mounted on said back members, a line shaft mounted on said top members, and a drum shaft mounted on said front members, each of said shafts being parallel to each other and extending entirely across the draw works; a drum on said drum shaft; a rotary drive means on said countershaft; line shaft drive means whereby said jack shaft may drive said line shaft; drum shaft drive means whereby said line shaft may drive said drum shaft; countershaft drive means whereby said jack shaft may drive said countershaft; and jack shaft drive means whereby said jack shaft may be driven.

8. In a draw works of the class described, the combination of: a pair of frame constructions, each having an upright structure including a back, a front, and a top member; a jack shaft mounted in a rearmost position on said frame construction, a countershaft mounted on said back members, a line shaft mounted on said top members, and a drum shaft mounted on said front members, each of said shafts being parallel to each other and extending entirely across the draw works; a drum on said drum shaft; a rotary drive means on said countershaft; line shaft drive means whereby said jack shaft may drive said line shaft; drum shaft drive means whereby said line shaft may drive said drum shaft; countershaft drive means whereby said jack shaft may drive said countershaft; an auxiliary drive means whereby said countershaft may drive said line shaft; and jack shaft drive means whereby said jack shaft may be driven.

9. In a draw works of the class described, the combination of: a pair of frame constructions; a jack shaft, a line shaft, a drum shaft, and a countershaft supported by said pair of frame constructions, each of said shafts being parallel to each other and extending entirely across the draw works; a drum on said drum shaft; a rotary drive means on said countershaft; line shaft drive means whereby said jack shaft may drive said line shaft; drum shaft drive means whereby said line shaft may drive said drum shaft; countershaft drive means whereby said countershaft may be driven independently of said other shafts; and jack shaft drive means whereby said jack shaft may be driven.

10. In a draw works of the class described, the combination of: a pair of frame constructions; a jack shaft, a line shaft, a drum shaft, and a countershaft supported by said pair of frame constructions, each of said shafts being parallel to each other and extending entirely across the draw works, said jack shaft being situated in a rearmost position, said countershaft being in front of said jack shaft, said line shaft being in front of said countershaft, and said drum shaft being in front of said line shaft; a drum on said drum shaft; a rotary drive means on said countershaft; line shaft drive means whereby said jack shaft may drive said line shaft; drum shaft drive means whereby said line shaft may drive said drum shaft; countershaft drive means whereby said countershaft may be driven independently of said other shafts; and jack shaft drive means whereby said jack shaft may be driven.

11. In a draw works of the class described, the combination of: a pair of frame constructions; a jack shaft, a line shaft, a drum shaft supported by said pair of frame constructions, each of said shafts being parallel to each other and extending entirely across the draw works, and a countershaft supported between said jack shaft and said drum shaft, said countershaft extending parallel to said other shafts and extending in back of said drum shaft; a drum on said drum shaft; a rotary drive means on said countershaft; line shaft drive means whereby said jack shaft may drive said line shaft; drum shaft drive means whereby said line shaft may drive said drum shaft; countershaft drive means whereby said countershaft may be driven independently of said other shafts; an auxiliary drive means whereby said countershaft may drive said line shaft; and jack shaft drive means whereby said jack shaft may be driven.

12. In a draw works of the class described, the combination of: a pair of frame constructions; a jack shaft, a line shaft, a drum shaft, and a countershaft supported by said pair of frame constructions, each of said shafts being parallel to each other and extending entirely across the draw works; a drum on said drum shaft; a rotary drive means on said countershaft; line shaft drive means whereby said jack shaft may drive said line shaft; drum shaft drive means whereby said line shaft may drive said drum shaft; countershaft drive means whereby said countershaft may be driven independently of said other shafts; auxiliary countershaft drive means whereby said jack shaft may drive said countershaft; and jack shaft drive means whereby said jack shaft may be driven.

13. In a draw works of the class described, the combination of: a pair of frame constructions; a jack shaft, a line shaft, a drum shaft, and a countershaft supported by said pair of frame constructions, each of said shafts being parallel to each other and extending entirely across the draw works, said jack shaft being situated in a rearmost position, said countershaft being in front of said jack shaft, said line shaft being in front of said countershaft, and said drum shaft being in front of said line shaft; a drum on said drum shaft; a rotary drive means on said countershaft; line shaft drive means whereby said jack shaft may drive said line shaft; drum shaft drive means whereby said line shaft may drive said drum shaft; countershaft drive means whereby said countershaft may be driven independently of said other shafts; auxiliary countershaft drive means whereby said jack shaft may drive said countershaft; and jack shaft drive means whereby said jack shaft may be driven.

14. In a draw works of the class described, the combination of: a pair of frame constructions; a jack shaft, a line shaft, a drum shaft supported by said pair of frame constructions, each of said shafts being parallel to each other and extending entirely across the draw works, and a countershaft supported between said jack shaft and said drum shaft, said countershaft extending parallel to said other shafts and extending in back of said drum shaft; a drum on said drum shaft; a rotary drive means on said countershaft; line shaft drive means whereby said jack shaft may drive said line shaft; drum shaft drive means whereby said line shaft may drive said drum shaft; countershaft drive means whereby said countershaft may be driven independently of said other shafts; auxiliary countershaft drive means whereby said jack shaft may drive said countershaft; an auxiliary drive means whereby said countershaft may drive said line shaft; and jack shaft drive means whereby said jack shaft may be driven.

15. In a draw works of the class described, the combination of: a pair of frame constructions; a jack shaft, a line shaft, a drum shaft, and a countershaft supported by said pair of frame constructions, each of said shafts being parallel to each other and extending entirely across the draw works; a drum on said drum shaft; a rotary drive means on said countershaft; line shaft drive means whereby said jack shaft may drive said line shaft; drum shaft drive means whereby said line shaft may drive said drum shaft; a sleeve rotatably mounted on said jack shaft; sleeve drive means whereby said sleeve may be driven; countershaft drive means whereby said sleeve may drive said countershaft; and jack shaft drive means whereby said jack shaft may be driven.

16. In a draw works of the class described, the combination of: a pair of frame constructions; a jack shaft, a line shaft, a drum shaft, and a countershaft supported by said pair of frame constructions, each of said shafts being parallel to each other and extending entirely across the draw works, said jack shaft being situated in a rearmost position, said countershaft being in front of said jack shaft, said line shaft being in front of said countershaft, and said drum shaft being in front of said line shaft; a drum on said drum shaft; a rotary drive means on said countershaft; line shaft drive means whereby said jack shaft may drive said line shaft; drum shaft drive means whereby said line shaft may drive said drum shaft; a sleeve rotatably mounted on said jack shaft; sleeve drive means whereby said sleeve may be driven; countershaft drive means whereby said sleeve may drive said countershaft; and jack shaft drive means whereby said jack shaft may be driven.

17. In a draw works of the class described, the combination of: a pair of frame constructions; a jack shaft, a line shaft, a drum shaft supported by said pair of frame constructions, each of said shafts being parallel to each other and extending entirely across the draw works, and a countershaft supported between said jack shaft and said drum shaft, said countershaft extending parallel to said other shafts and extending in back of said drum shaft; a drum on said drum shaft; a rotary drive means on said countershaft; line shaft drive means whereby said jack shaft may drive said line shaft; drum shaft drive means whereby said line shaft may drive said drum shaft; a sleeve rotatably mounted on said jack shaft; sleeve drive means whereby said sleeve may be driven; countershaft drive means whereby said sleeve may drive said countershaft; an auxiliary drive means whereby said countershaft may drive said line shaft; and jack shaft drive means whereby said jack shaft may be driven.

18. In a draw works of the class described, the combination of: a pair of frame constructions; a jack shaft, a line shaft, a drum shaft, and a countershaft supported by said pair of frame constructions, each of said shafts being parallel to each other and extending entirely across the draw works; a drum on said drum shaft; a rotary drive means on said countershaft; line shaft drive means whereby said jack shaft may drive said line shaft; drum shaft drive means whereby said line shaft may drive said drum shaft; a sleeve rotatably mounted on said jack shaft; sleeve drive means whereby said sleeve may be driven; countershaft drive means whereby said sleeve may drive said countershaft; auxiliary countershaft drive means whereby said jack shaft may drive said countershaft; and jack shaft drive means whereby said jack shaft may be driven.

19. In a draw works of the class described, the combination of: a pair of frame constuctions; a jack shaft, a line shaft, a drum shaft, and a countershaft supported by said pair of frame constructions, each of said shafts being parallel to each other and extending entirely across the draw works, said jack shaft being situated in a rearmost position, said countershaft being in front of said jack shaft, said line shaft being in front of said countershaft, and said drum shaft being in front of said line shaft; a drum on said drum shaft; a rotary drive means on said countershaft; line shaft drive means whereby said jack shaft may drive said line shaft; drum shaft drive means whereby said line shaft may drive said drum shaft; a sleeve rotatably mounted on said jack shaft; sleeve drive means whereby said sleeve may be driven; countershaft drive means whereby said sleeve may drive said countershaft; auxiliary countershaft drive means whereby said jack shaft may drive said countershaft; and jack shaft drive means whereby said jack shaft may be driven.

20. In a draw works of the class described, the combination of: a pair of frame constructions; a jack shaft, a line shaft, a drum shaft supported by said pair of frame constructions, each of said shafts being parallel to each other and extending entirely across the draw works, and a countershaft supported between said jack shaft and said drum shaft, said countershaft extending parallel to said other shafts and extending in back of said drum shaft; a drum on said drum shaft; a rotary drive means on said countershaft; line shaft drive means whereby said jack shaft may drive said line shaft; drum shaft drive means whereby said line shaft may drive said drum shaft; a sleeve rotatably mounted on said jack shaft; sleeve drive means whereby said sleeve may be driven; countershaft drive means whereby said sleeve may drive said countershaft; auxiliary countershaft drive means whereby said jack shaft may drive said countershaft; an auxiliary drive means whereby said countershaft may drive said line shaft; and jack shaft drive means whereby said jack shaft may be driven.

21. In a draw works of the class described, the combination of: a pair of frame constructions; a jack shaft, a line shaft, a drum shaft, and a countershaft supported by said pair of frame constructions, each of said shafts being parallel to each other and extending entirely across the draw works; a drum on said drum shaft; a rotary drive means on said countershaft; line shaft drive means whereby said jack shaft may drive said line shaft; drum shaft drive means whereby said line shaft may drive said drum shaft; countershaft drive means whereby said jack shaft may drive said countershaft; an auxiliary drive means whereby said countershaft may drive said line shaft; and jack shaft drive means whereby said jack shaft may be driven.

WILLIAM D. DAVIDSON.

DISCLAIMER 1,953,339.—*William D. Davidson*, Los Angeles, Calif. DRAW WORKS. Patent dated April 3, 1934. Disclaimer filed June 11, 1935, by the assignee, *Emsco Derrick & Equipment Company*.

Hereby enters this disclaimer to those parts of the claims in said specification which are in the following words, to-wit:

"1. In a draw works of the class described, the combination of: a pair of frame constructions; a jack shaft, a line shaft, a drum shaft, and a countershaft supported by said pair of frame constructions, each of said shafts being parallel to each other and extending entirely across the draw works; a drum on said drum shaft; a rotary drive means on said countershaft; line shaft drive means whereby said jack shaft may drive said line shaft; drum shaft drive means whereby said line shaft may drive said drum shaft; countershaft drive means whereby said jack shaft may drive said countershaft; and jack shaft drive means whereby said jack shaft may be driven."

"9. In a draw works of the class described, the combination of: a pair of frame constructions; a jack shaft, a line shaft, a drum shaft, and a countershaft supported by said pair of frame constructions, each of said shafts being parallel to each other and extending entirely across the draw works; a drum on said drum shaft; a rotary drive means on said countershaft; line shaft drive means whereby said jack shaft may drive said line shaft; drum shaft drive means whereby said line shaft may drive said drum shaft; countershaft drive means whereby said countershaft may be driven independently of said other shafts; and jack shaft drive means whereby said jack shaft may be driven."

"12. In a draw works of the class described, the combination of: a pair of frame constructions; a jack shaft, a line shaft, a drum shaft, and a countershaft supported by said pair of frame constructions, each of said shafts being parallel to each other and extending entirely across the draw works; a drum on said drum shaft; a rotary drive means on said countershaft; line shaft drive means whereby said jack shaft may drive said line shaft; drum shaft drive means whereby said line shaft may drive said drum shaft; countershaft drive means whereby said countershaft may be driven independently of said other shafts; auxiliary countershaft drive means whereby said jack shaft may drive said counter shaft; and jack shaft drive means whereby said jack shaft may be driven."

"21. In a draw works of the class described, the combination of: a pair of frame constructions; a jack shaft, a line shaft, a drum shaft, and a countershaft supported by said pair of frame constructions, each of said shafts being parallel to each other and extending entirely across the draw works; a drum on said drum shaft; a rotary drive means on said countershaft; line shaft drive means whereby said jack shaft may drive said line shaft; drum shaft drive means whereby said line shaft may drive said drum shaft; countershaft drive means whereby said jack shaft may drive said countershaft; an auxiliary drive means whereby said countershaft may drive said line shaft; and jack shaft drive means whereby said jack shaft may be driven."

[*Official Gazette July 2, 1935.*]